United States Patent
Teresi (12)

(10) Patent No.: US 11,501,379 B2
(45) Date of Patent: Nov. 15, 2022

(54) AUTOMATED CONTINUOUS INSURANCE POLICY TRACKING AND ENDORSEMENT MANAGEMENT PROCESS AND SYSTEM

(71) Applicant: Certificial, LLC, New York, NY (US)

(72) Inventor: Peter Teresi, Closter, NJ (US)

(*) Notice: Subject to any disclaimer, the term of this patent is extended or adjusted under 35 U.S.C. 154(b) by 0 days.

(21) Appl. No.: 16/905,956

(22) Filed: Jun. 19, 2020

(65) Prior Publication Data

US 2020/0402179 A1 Dec. 24, 2020

Related U.S. Application Data (60) Provisional application No. 62/863,525, filed on Jun. 19, 2019.

(51) Int. Cl.

| | |
|---|---|
| *G06Q 40/08* | (2012.01) |
| *G06Q 10/10* | (2012.01) |
| *G06F 9/54* | (2006.01) |
| *G06Q 30/02* | (2012.01) |
| *G06Q 30/00* | (2012.01) |

(52) U.S. Cl.
CPC ............ *G06Q 40/08* (2013.01); *G06F 9/547* (2013.01); *G06Q 10/10* (2013.01); *G06Q 30/0185* (2013.01); *G06Q 30/0282* (2013.01)

(58) Field of Classification Search
CPC .... G06Q 40/08; G06Q 10/10; G06Q 30/0185; G06Q 30/0282; G06F 9/547
USPC ...................................................... 705/3–44
See application file for complete search history.

(56) References Cited

U.S. PATENT DOCUMENTS

| | | | | |
|---|---|---|---|---|
| 7,398,220 | B1* | 7/2008 | Hayes ................... | G06Q 40/08 705/4 |
| 8,271,301 | B1* | 9/2012 | Nordyke ............... | G06Q 40/08 705/36 R |
| 8,447,637 | B2* | 5/2013 | Read ..................... | G06Q 40/02 705/4 |
| 8,666,786 | B1* | 3/2014 | Wirz ..................... | G06Q 40/08 705/30 |
| 8,833,639 | B1* | 9/2014 | Hopkins, III ...... | G06Q 20/1085 235/375 |
| 9,922,356 | B1* | 3/2018 | Garcia, III ............ | G03B 37/02 |
| 2002/0198745 | A1* | 12/2002 | Scheinuk ............... | G06Q 40/08 705/4 |
| 2012/0123808 | A1* | 5/2012 | Jones .................... | G06Q 10/10 705/4 |
| 2013/0062398 | A1* | 3/2013 | Wang ................... | B23K 1/0016 228/203 |

(Continued)

OTHER PUBLICATIONS

Oberly et al., Managing the paperwork for contractors, project owners, American Agents & Broker, 68.7:22., ALM Media Properties, LLC, Jul. 1996.*

(Continued)

*Primary Examiner* — Frantzy Poinvil
(74) *Attorney, Agent, or Firm* — Prince Lobei Tye LLP; Brian M. Dingman (57) ABSTRACT

An automated computer-implemented insurance tracking process comprising allowing an insured to select insurance-related information that can be shared with a particular requestor, automatically saving the selected insurance-related information in a computer memory, and automatically providing, to the particular requestor, digital access to the saved information.

8 Claims, 7 Drawing Sheets

(56) References Cited

U.S. PATENT DOCUMENTS

| | | | | |
|---|---|---|---|---|
| 2014/0039935 A1* | 2/2014 | Rivera | ................... | G06Q 40/08 |
| | | | | 705/4 |
| 2014/0108061 A1* | 4/2014 | Jones | ..................... | G06Q 40/08 |
| | | | | 705/4 |
| 2014/0222470 A1* | 8/2014 | Arnatt | ................ | G06Q 30/0621 |
| | | | | 705/4 |
| 2014/0229205 A1* | 8/2014 | Gibson | ................. | G06Q 10/10 |
| | | | | 705/4 |
| 2014/0278582 A1* | 9/2014 | Shambach | ............. | G06Q 40/08 |
| | | | | 705/4 |
| 2017/0344914 A1* | 11/2017 | Mashiach | .............. | G06Q 30/04 |

OTHER PUBLICATIONS

Malecki, :Take a close look at updated accord certificate, Rough Notes, 144.3: 79, Rough Notes Co., Inc. Mar. 2001.*

* cited by examiner

AUTOMATED CONTINUOUS INSURANCE POLICY TRACKING AND ENDORSEMENT MANAGEMENT PROCESS AND SYSTEM

CROSS-REFERENCE TO RELATED APPLICATION

This application claims priority of Provisional Application 62/863,525 filed on Jun. 19, 2019.

BACKGROUND

This disclosure relates to an automated insurance policy tracking and endorsement management system and process.

Insurance verification is an essential part of business and compliance. Business partners share and amend insurance policies to protect their financial interests. Insurance compliance requirements change based on line of business, complexity, and risk of engagement. Engagements often span 3-10+ years and require ongoing insurance protection to maintain compliance. Risks associated with non-compliant insurance include financial loss, legal issues, reputational risk, negative impact to strategic goals, organizational embarrassment, internal opportunity loss, project halt and delays.

Current insurance verification processes require the use of point-in-time documents to share insurance related details and endorsements between stakeholders. Customers are unable to quickly produce such insurance documents, which may impact their ability to close new business. Insurance agents and brokers may be unable to keep up with growing demands and employee needs to manage daily workflows. Insight into third-party requests for insurance is a challenge causing delays or the need to reissue documents more than once. Rekeying and manual extraction of insurance information is required by certificate holder management systems due to the utilization of documents.

The end result is that the process to manage certificates of insurance (CoIs) is inefficient and costly for all stakeholders involved—the requestor, the insured, and the insurance provider. CoIs are point-in-time documents requiring organizations to request updated certificates on an ongoing basis. Fraudulent activity, coverage changes and cancellations make it impossible for stakeholders to maintain a proper level of compliance between updates and protect their core business.

SUMMARY

The subject system and process provides for real-time digital insurance verification by enabling insurance providers, insureds, and requestors to share information electronically, which can include application programming interfaces (APIs) for automated information sharing, and electronic messaging for manual sharing. This transforms legacy processes and enables the electronic sharing of insurance details and endorsements among insurance providers, insureds, and third-party requestors. It also enables instant coverage requirement comparison for requestors, automates renewals and policy updates eliminating the need to re-request information, enables transparency and streamlines workflows amongst requestors, policy holders and insurance providers, and reduces the risk of fraud, misinformation, lapses, or reductions in coverage.

Some of the benefits of the subject system and process include: reduced operational costs for all stakeholders; increased overall compliance and elimination of the need to reply on point-in-time information; reduced E&O exposure, insurance fraud and misinformation; ability to generate new insurance documents anytime using current, secure and verified information; and prevention of uninsured activities by utilizing 3rd party integration features.

The subject system and process involves an automated system that includes a database that maintains up to date insurance policy related information. In an example the policy data is automatically retrieved from an insurance provider database, for example by using one or more APIs that interface the automated system to the insurance company's database. The policy data can be updated continuously, or it can be provided on-demand. Then, third parties that have been authorized by the insured or the insured's agent can electronically access or request policy data, and the automated system can provide the requested policy data. In an example the requested policy data includes an automatically generated, up to date, certificate of insurance. Third party requestor systems can automatically receive compliance alerts from the subject system and can automatically provide to the insured communications or necessary actions as a result, such as deny building access, pause/cancel order, stop invoice payment, and remove system access.

Featured in this disclosure is an automated, computer-implemented continuous tracking process and system for information relating to insurance policies. The system allows those who need to verify certain insurance coverage ("requestors") to be granted electronic access by a policy holder ("insured") to data that includes necessary aspects of a relevant insurance policy or a part thereof, or to related information (such as a certificate of insurance or CoI). The system streamlines the process of insurance verification and makes more accurate information exchange and records interactions between any two or more of policy holders, insurance providers, insurance brokers ("agents"), and requestors. The system provides for instant digital verification of insurance.

The system also provides for the ability to electronically grant and execute endorsements. Although in the preferred embodiment the verification and endorsement are performed together during the request/share process, verification and endorsement are separate actions that are individually contemplated in the subject system.

The system also provides for the ability to automatically generate and send or print traditional CoI documents from data stored on the system. The system allows stakeholders (requestors, insured, agents, etc.) to generate an updated CoI with the click of a button. The Requestor is thus able to create an updated COI at any time, without the need for the Agent or Insured to take any action, since all of the data that is needed to create the COI is stored electronically and has been previously verified. This process leverages the underlying data in a continuous fashion to prove insurance coverage, as opposed to the current methods of using point-in-time data tied to how issued COIs are used today.

The system also has the ability to automatically compare requestor requirements against received/requested policy data. Some existing certificate management systems available today perform this comparison after the data has been manually entered into the system by viewing a certificate of insurance. In contrast, in the subject system there can be an instant electronic comparison of a Requestor's requirements against an Insured's Policy data during the request process. Also, all parties, including the Agent, can be automatically notified of any issues, for example by emails that are automatically generated and sent by the system. The issues include but are not limited to types of insurance being requested, required limits, and requested endorsements. As a result, all stakeholders can instantly identify (and presumably then resolve) issues during the request process without the need for manual intervention.

The system also allows an insured to be able to have any requests and issues sent directly to an agent. This streamlines existing workflows and enables the agent to have direct access to those requesting Insurance details from their client. In addition, the insured can, via the system, grant to the agent the right to directly act on behalf of the insured. This allows the agent to independently fulfill third party requests.

Exemplary systems and processes are set forth elsewhere herein.

Following are some of the factors that differentiate the subject system from existing manners by which requestors attempt to verify insurance coverage. Continuous tracking of policy information can eliminate the need to request updates and alerts of any compliance related issues. Evidence reporting can provide a detailed, time-stamped, and immutable transactional log of the entire process, including policy creation date, verification, sharing, endorsements and more. In an example the system leverages existing technologies to ensure data privacy, protection, and authenticity. Using this technology enables multiple stakeholders to interact with each other and all that interaction and information is recorded in real-time in such a way that all stakeholders can trust the data in the system, changes to the policy coverage, endorsements, etc., as well as data that is accessed via external systems through APIs. The system is designed to provide benefits to all stakeholders. For agents, benefits include new leads and better customer insight. For insureds, benefits include improved customer experience and ease of business. For requestors, benefits include increased compliance and reduction of risk. For all users, benefits include operational efficiency and reduced costs. Digital endorsements provide the ability to grant endorsements electronically with supporting contractual language. The system comprises a data driven platform that is designed to transport policy data and is not dependent on traditional point-in-time documents.

Continuous tracking (monitoring) can be enabled by the use of APIs that provide direct integration to Agent/Broker systems (e.g., Agency Management Systems) as well as Insurance Provider systems (e.g., Policy Admin Systems). Continuous tracking ensures data is always kept up to date and enables several other product features. Policy updates can also be provided by the Agent/Broker or Provider by logging on directly to the system.

All examples and features mentioned below can be combined in any technically possible way.

In one aspect, an automated computer-implemented insurance tracking process includes allowing an insured to select insurance-related information that can be shared with a particular requestor, automatically saving the selected insurance-related information in a computer memory of a computer-based system, and automatically providing, to the particular requestor, digital access to the saved information.

Some examples include one of the above and/or below features, or any combination thereof. In an example the selected insurance-related information comprises a certificate of insurance. In an example the process further comprises allowing an insured to grant and execute an endorsement of an existing policy. In an example the process further comprises comparing requestor requirements against received/requested policy data. In some examples the process further comprises automatically notifying one or all of the insured, the requestor, and the agent of outstanding issues identified during the comparison. In an example the outstanding issues comprise types of insurance being requested, required limits, and requested endorsements.

Some examples include one of the above and/or below features, or any combination thereof. In an example the process further comprises allowing a user of the system to automatically generate a current certificate of insurance from data stored on the system. In some examples the process further comprises allowing an insured to have any requests and outstanding issues sent directly to an agent who represents the insured. In an example the process further comprises allowing the insured to grant to the agent the right to directly act on behalf of the insured via the system.

Some examples include one of the above and/or below features, or any combination thereof. In some examples the process further comprises continuous tracking of insurance policy data, to keep saved insurance-related information up to date. In an example the continuous tracking is facilitated by the use of an application programming interface (API) that is configured to provide direct integration into a third-party insurance data management system. In an example the system utilizes real-time compliance to interact with other systems via an application programming interface (API) to change access controls and prevent uninsured activities. In some examples the process further comprises producing an output that comprises the saved information. In an example the output comprises a printout or display on a computer screen.

Some examples include one of the above and/or below features, or any combination thereof. In some examples the process further comprises allowing an insurance carrier to directly and automatically interface with the system. In an example the insurance carrier provides policy details and endorsement documents. In some examples the process further comprises allowing an insurance carrier rating organization to directly and automatically interface with the system. In an example the insurance carrier rating organization provides insurance carrier identification and rating information.

In another aspect an automated computer-implemented insurance tracking process includes allowing an insured to select insurance-related information that can be shared with a particular requestor, wherein the selected insurance-related information comprises a certificate of insurance, automatically saving the selected insurance-related information in a computer memory of a computer-based system, automatically providing, to the particular requestor, digital access to the saved information, allowing an insured to grant and execute an endorsement of an existing policy, comparing requestor requirements against received/requested policy data and automatically notifying one or all of the insured, the requestor, and the agent of outstanding issues identified during the comparison, allowing a user of the system to automatically generate a current certificate of insurance from data stored on the system, and providing continuous tracking of insurance policy data, to keep saved insurance-related information up to date, wherein the continuous tracking is facilitated by the use of an application programming interface (API) that is configured to provide direct integration into a third-party insurance data management system.

Some examples include one of the above and/or below features, or any combination thereof. In an example the process further comprises allowing an insurance carrier to directly and automatically interface with the system, wherein the insurance carrier provides policy details and endorsement documents, and further comprises allowing an insurance carrier rating organization to directly and automatically interface with the system, wherein the insurance carrier rating organization provides insurance carrier identification and rating information.

DETAILED DESCRIPTION

The subject system and process provides for real-time digital insurance verification by enabling insurance providers, insureds, and requestors to share information electronically. This transforms legacy processes and enables the electronic sharing of insurance details and endorsements among insurance providers, insureds, and third-party requestors. It also enables instant coverage requirement comparison for requestors, automates renewals and policy updates eliminating the need to re-request information, enables transparency and streamlines workflows amongst requestors, policy holders and insurance providers, and reduces the risk of fraud, misinformation, lapses, or reductions in coverage. Note that the policy details that are to be shared can be added manually, or an API can be used to automatically interface with the third-party system (e.g., an insurance agency management system) and provide the necessary policy details to be shared with a third party. Note also that references to agent management systems is illustrative not limiting and does not exclude other third-party systems such as Policy Admin Systems.

Figure 1:
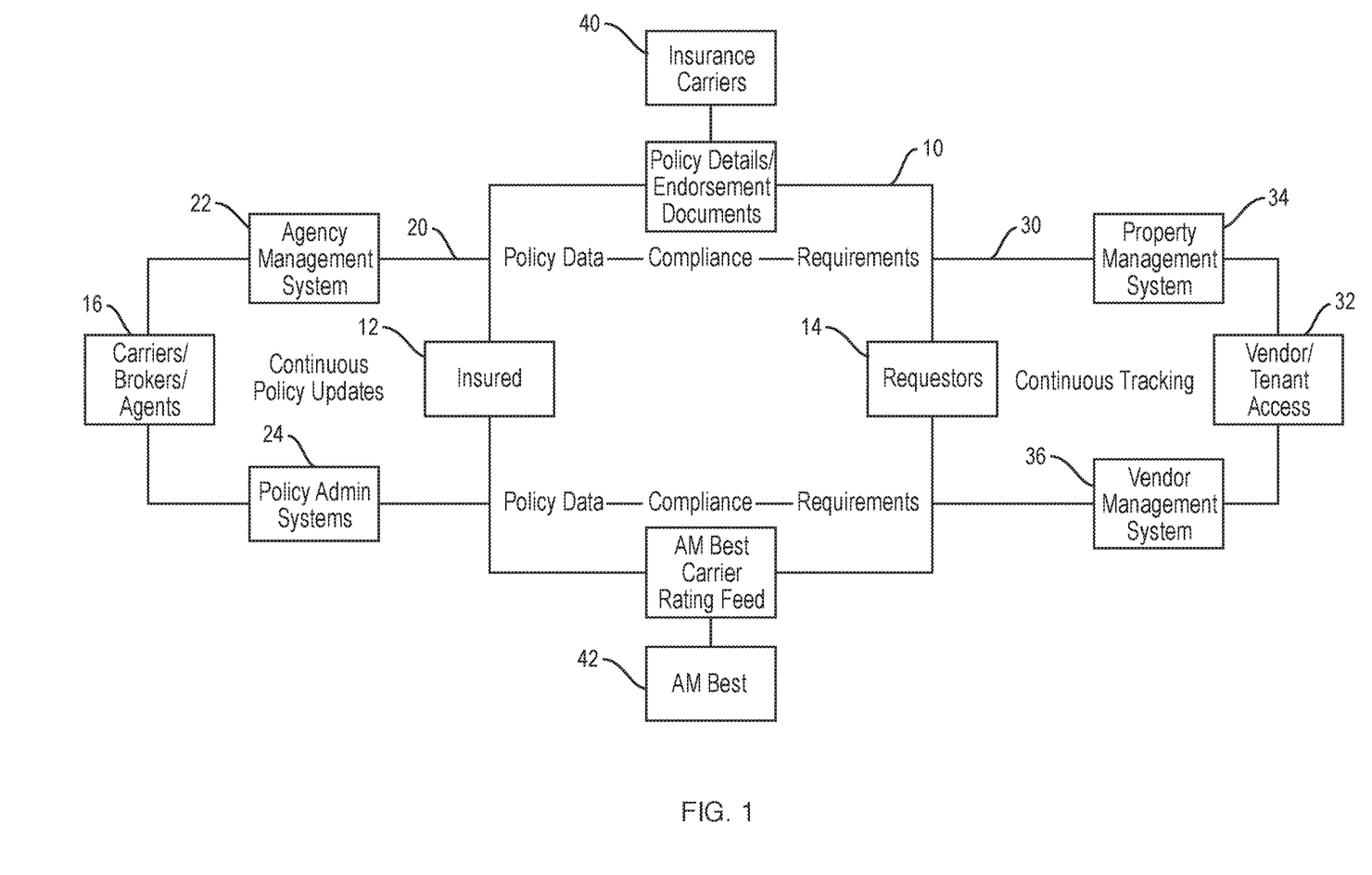
FIG. 1 is a functional block diagram of an automated continuous insurance policy tracking and reporting process and system and its interaction with interested parties.

FIG. 1 is a functional block diagram of an automated continuous insurance policy tracking and reporting system 10, and its interaction with interested parties. The insured 12 and third-party requestors of information regarding the insured's policy 14 both interact with system 10. Carriers/brokers/agents 16 interact with system 10 via one or both of agency management systems 22 and policy admin systems 24 as part of a process 20 whereby the insured's policy information is continuously and automatically updated. Policy information can be continuously tracked 30, for example to provide vendor or tenant access 32 via a property management system 34 and/or a vendor management system 36. More detail is provided below.

In an example insurance carriers 40 can also interact with system 10, such as by providing policy details and endorsement documents. System 10 can integrate directly with insurance carrier systems to perform the same functions and roles as an agent/broker. Additional functionality is available for carriers, which allows them to approve and supply information required for endorsements. Carriers determine how endorsements are granted and often provide the specific language required to describe available coverages. Incorporating the carrier such that it can directly interact with system 10 brings all parties together required to successfully verify and provide insurance coverage to requestors.

Carrier involvement will also be effective to eliminate fraudulent and misrepresentation of policy details. This is large problem which often results in claims being declined and requestors at risk of financial loss. Agents and brokers can both falsify and mis-represent policy details due to the lack of transparency which exists in the process today. System 10 provides all stakeholders access to policy details and endorsements, and enables each stakeholder to approve the portion of information for which they are responsible. Eliminating fraudulent and misrepresented policy information will save the insurance industry lost revenue.

In an example an insurance carrier rating organization 42 (such as AM Best) can also interact with system 10 via a direct carrier rating feed. This direct integration provides directly to system 10 a full listing from organization 42 of all carrier names, their NAICS code, and their current rating from organization 42. Financial strength ratings can be used to indicate the current financial strength of the insurance carrier. All policies stored on system 10 include the carrier information and its rating, which can easily be seen by viewing the details of a policy. Since carrier ratings can change at any time, the integration allows for organization to continuously or periodically (e.g., every day) send updated information.

Requestors often require vendors (insureds) policies to be provided by a carrier with a minimum defined rating or higher, which is determined by the requestor. Such ratings can be configured with insurance requirement templates, or when making a one-time request for Insurance.

Requestor carrier rating requirements are systematically compared against the insurer rating details stored within the policy in real-time and continuously monitored as ratings are update via the integration with the ratings organization 42. Should a discrepancy occur, a compliance alert can be generated, alerting all stakeholders of the detected issue.

This process today is manual and requires each stakeholder to look up a carrier rating for every policy reviewed by each vendor. System 10 is able to completely automate this compliance check and continue to maintain the compliance on a daily basis.

Figure 2:
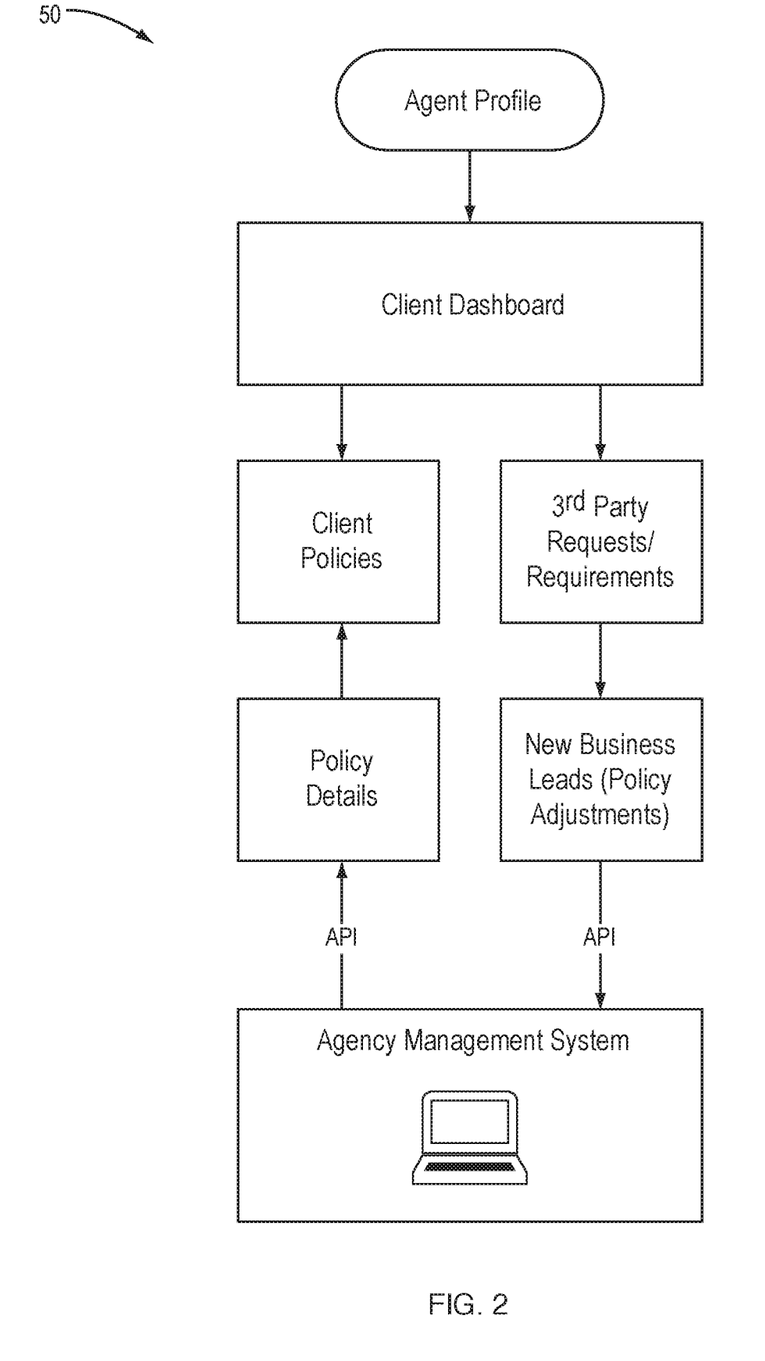
FIG. 2 details an insurance agent's role in an automated continuous insurance policy tracking and reporting process and system.

In some examples of the present system, the insurance agent is often the party that will use the system. The system allows the agent to keep the insured's policy information up to date and thus be able to immediately (and in some examples, automatically) satisfy third party requests (e.g., requests for COIs). FIG. 2 presents a flowchart 50 of the insurance agent role. Insurance agents provide policy details to their clients (insured's profile). This provides an improved customer experience for clients and eliminates the need for agents to produce point-in-time documents. This process can be automated by utilizing APIs but can also be performed manually using an agent profile function. Insurance agents gain new insights into the need of their clients as they have access to view third-party requests for insurance. This improves communication and creates an efficient workflow for sharing information required to service third-party requests. The system is designed to instantly compare policy details against third-party requirements. Insurance agents are automatically alerted by the system of any issues or lack of coverage requirements, providing the ability to proactively quote new business and provide superior customer service. The system enables a key component to transform an agency to a digital insurer and provides agencies a competitive advantage.

In some examples, the agent role responsibilities include: policy verification; policy creation, updates, documentation, and cancellations; blanket endorsement management; complex endorsement approvals; and electronic signatures and certificate of insurance generation.

Figure 3:
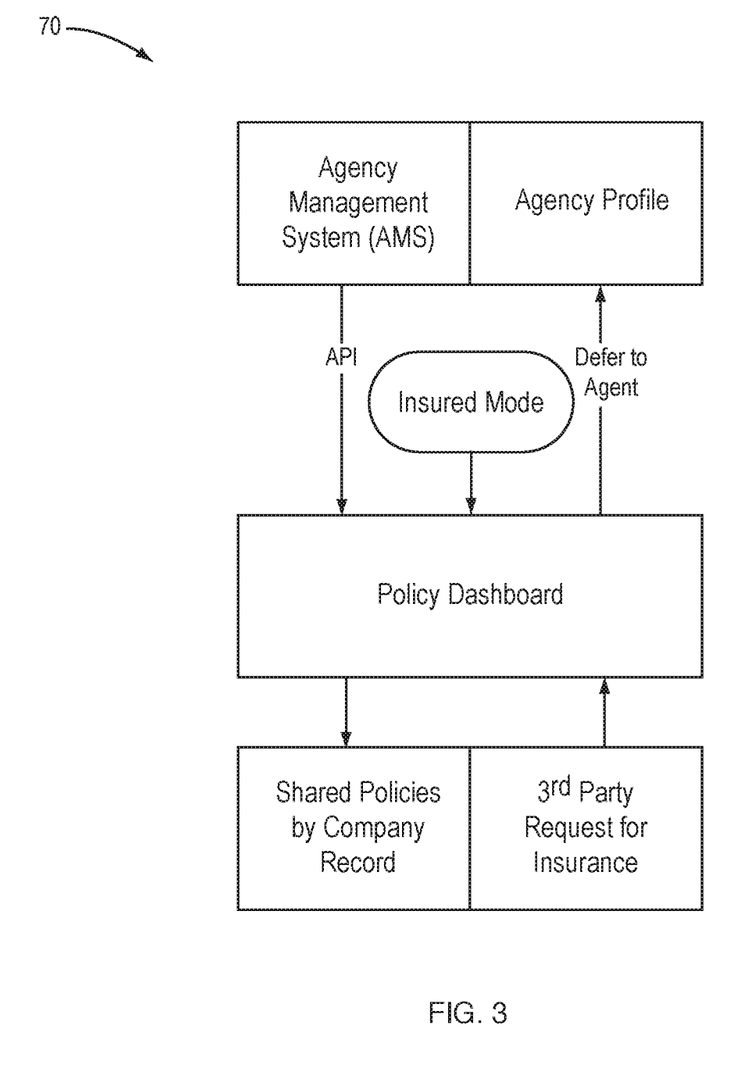
FIG. 3 details an insured's role in an automated continuous insurance policy tracking and reporting process and system.

The insured's role is outlined in flowchart 70, FIG. 3. Insureds fulfill requests for insurance by sharing specific policy information. They also approve and grant requested endorsements. The insured can manually enter their policy data and have it verified by an insurance agent or receive the policy information directly from an agent's AMS when integration has been configured. This assures policy information remains current and enables the ability for continuous monitoring. Insureds have access to all policies on their dashboard. Alerts are generated when a request for insurance coverage has been received. Once fulfilled, an insured can open up company records and review the specific coverage and endorsements granted to a 3rd party organization. The system enables an insured to quickly service insurance requests and streamlines their ability to engage in new business. It also enables the ability to defer specific request details to agents so they can proactively adjust coverage as needed reducing time and costs for all. An insured can grant administrative access to their insurance agent enabling the ability for them to service third-party requests on their behalf. The insured will also have access to their policy data and the ability to see all third parties that are tracking their insurance along with endorsements granted. If an insured would like to generate a traditional CoI document, they can simply do so by clicking "Generate CoI" on any company record and the document will be created using agent verified information from the system.

Figure 4:
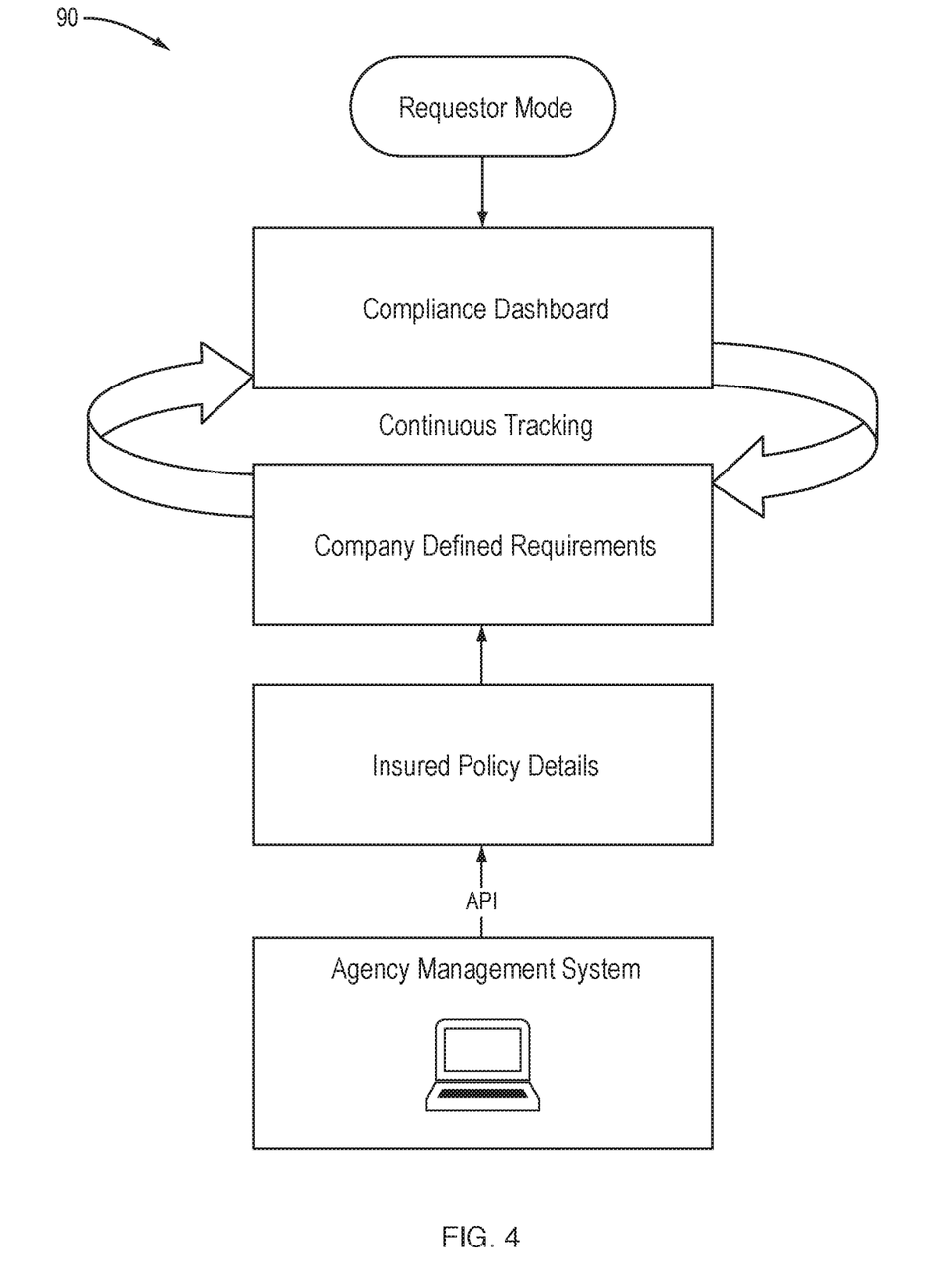
FIG. 4 details a requestor's role in an automated continuous insurance policy tracking and reporting process and system.

The requestor's role is outlined by flowchart 90, FIG. 4. Third party requestors generate requests to verify a business partner has sufficient insurance coverage to protect the financial interest of an engagement. This is achieved by the requestor configuring their specific requirements into reusable templates. Templates enable several product features including supplying detailed requests to an insured illustrating specific coverage types, required limits and requested endorsements, ensuring received policies meet applicable requirements, and enabling continuous tracking: monitoring of policy changes after acceptance to ensure ongoing compliance. The system provides requestors a platform to effectively and efficiently request and monitor insurance policies in one location. Compliance is greatly enhanced and protects ongoing B2B interactions. Evidence tracking is one of many reports available and shows the entire history of all policy transactions. This can help resolve claims and again increase overall compliance. The system reduces time, risk and costs associated with managing third party insurance policies. The system transforms a legacy process by providing continuous updates of policy information and eliminates manual, time consuming tasks. In the event a requestor would like to generate a traditional CoI document, they can simply do so my clicking "Generate CoI" on any company record and the document will be created using agent verified information from the system. This feature can also be used to generate an updated CoI for filing or other compliance related reasons.

Figure 5:
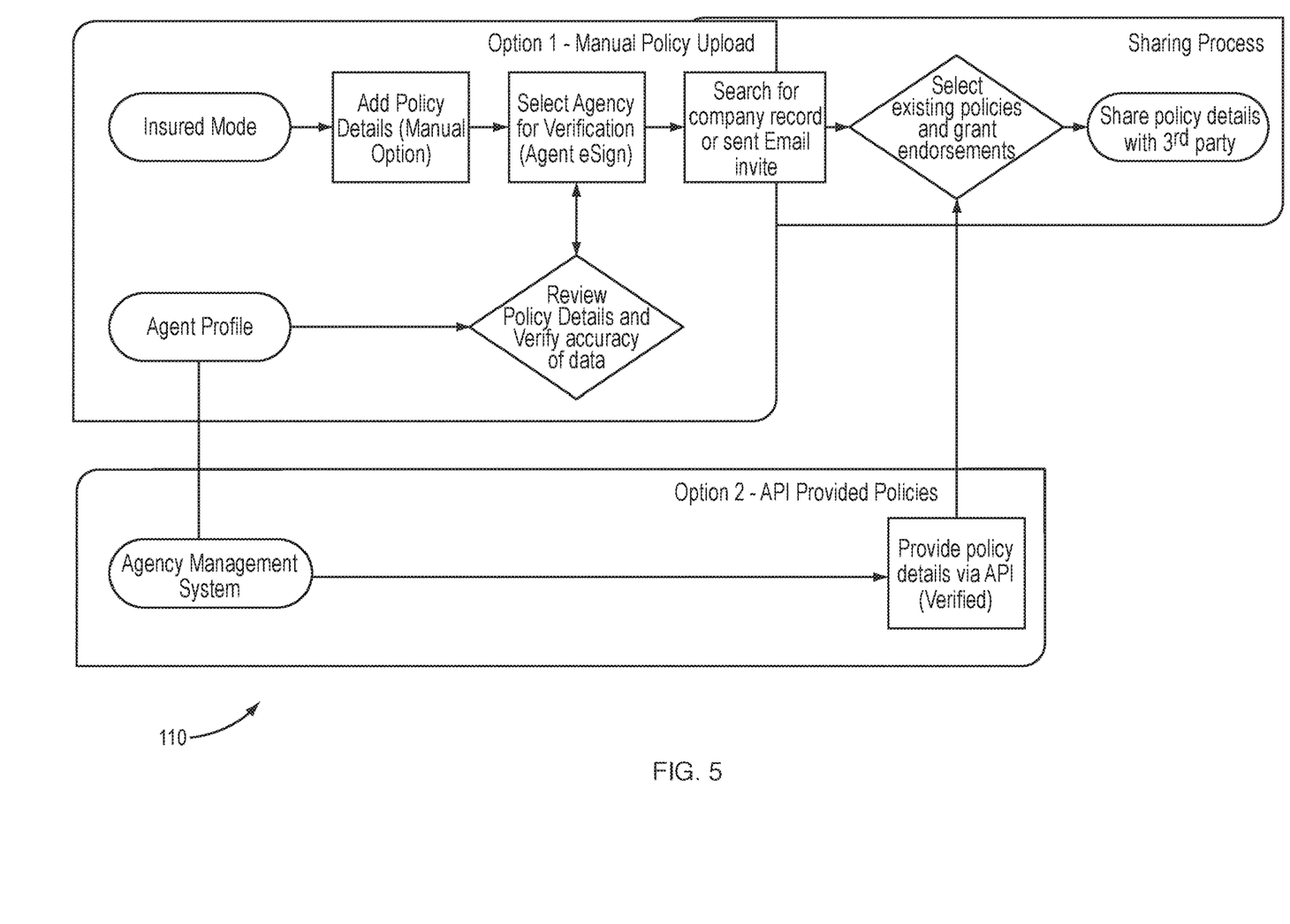
FIG. 5 illustrates an insured-initiated sharing of policy details in an automated continuous insurance policy tracking and reporting process and system.

An exemplary insured initiated share action is detailed in flowchart 110, FIG. 5. Both manual policy uploads and automated sharing (using policy information provided from agency management systems via API) are detailed. In the manual mode insurance information is verified by the agent. In the automated mode since the information comes directly from the management system of the insurance agency, it is verified by definition.

Figure 6:
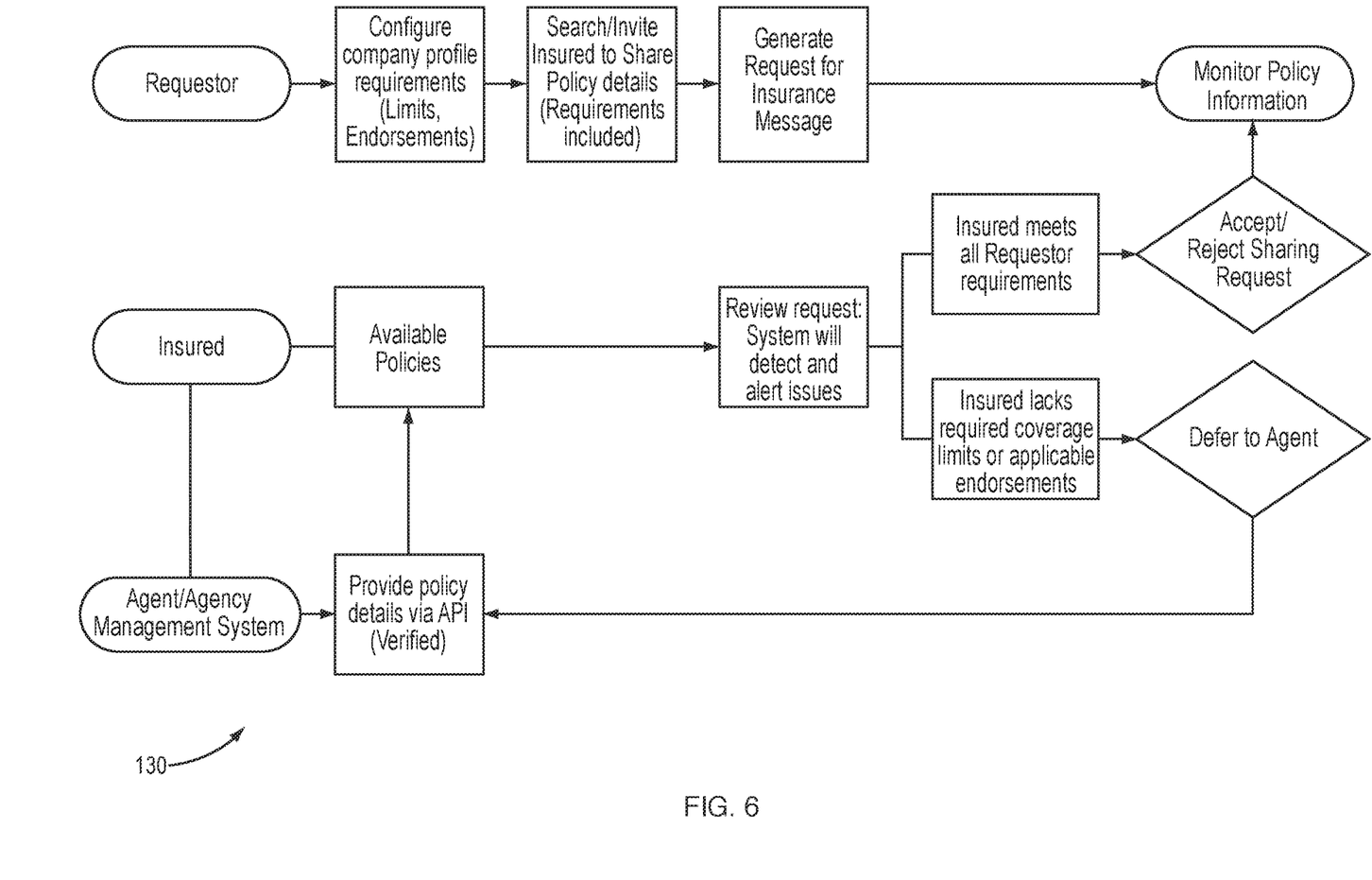
FIG. 6 illustrates an insurance verification request in an automated continuous insurance policy tracking and reporting process and system.

An exemplary insurance verification request is detailed in flowchart 130, FIG. 6. The party requesting insurance verification (the requester), the insured (directly or via an agent) and the agent of the agency management system, are all involved in the process. If the requestor's requirements are not met action defers to the agent. If it is met and the insured accepts an information sharing request, the requestor is able to monitor the relevant policy information.

Figure 7:
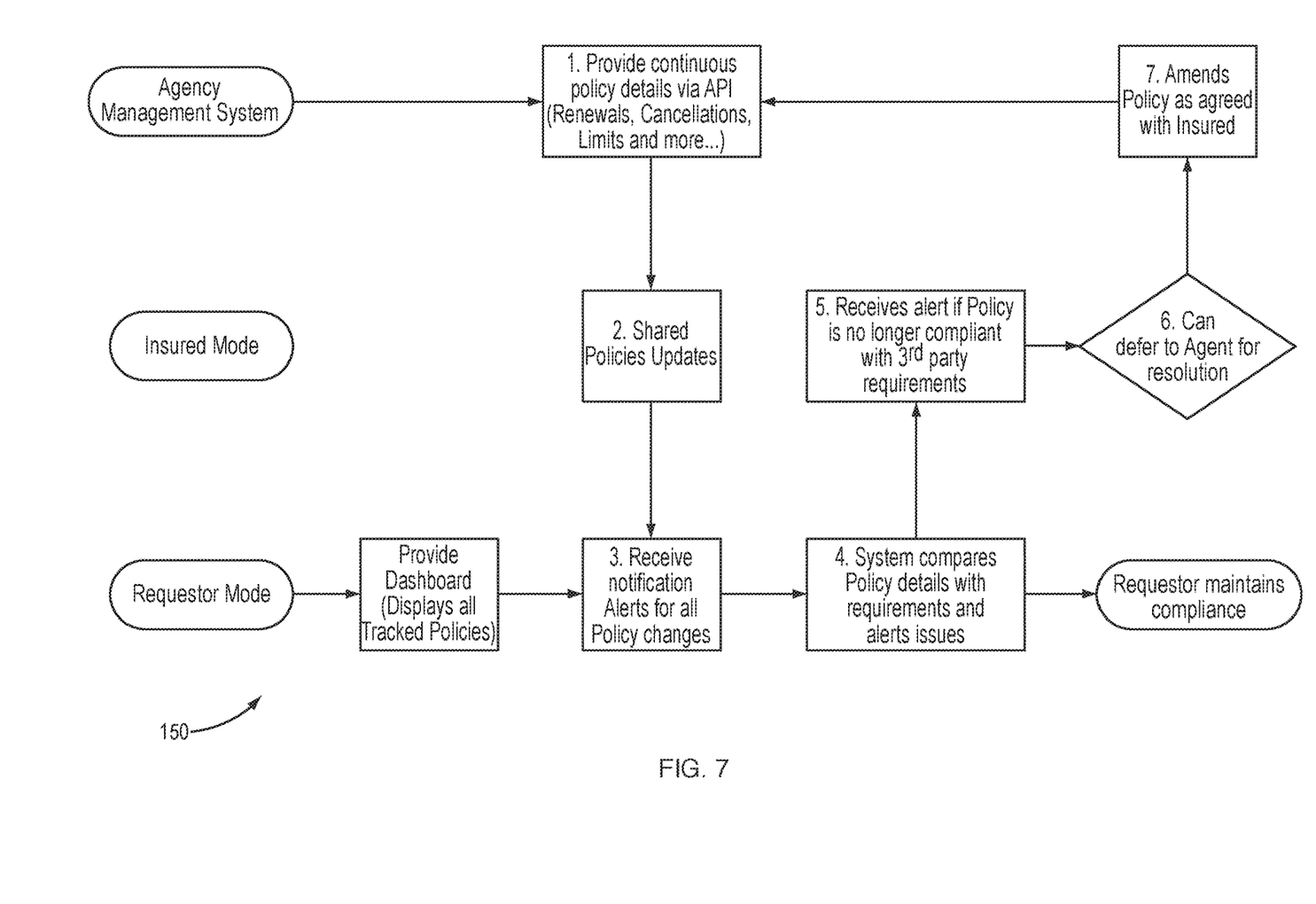
FIG. 7 illustrates continuous monitoring of insurance policy details in an automated continuous insurance policy tracking and reporting process and system.

An exemplary continuous monitoring action is detailed in flowchart 150, FIG. 7. Continuous monitoring employs automatic inputs (via API) from the agency management system. A requestor has a dashboard in system 10 from which tracked policies are available to be seen and selected. If the policy is no longer compliant with third-party requirements an alert is issued by system 10. Typically, the agent receives the alert and works with the insured to appropriately amend the policy so that it is in compliance.

System 10 can provide for interfaces with insureds, agents, and requestors. Agents can have access to the information stored in system 10 to view policy details and manage endorsements. Insureds, agents, and requestors can have access to all of the relevant policies and the policy details including policy type, carrier, policy number, limits, if the policy is verified and when the policy was last verified, the agent's name, and any other information deemed useful or important. A dashboard can include a button icon that automatically generated a COI. A policy request template can be included that allows the insured or agent to configure all requirements of any policy requests that can be made. The dashboard can also allow management and viewing of real-time compliance detection and alerts. For example when a policy is viewed through the dashboard, items that do not comply with requested requirements can be highlighted. This allows the viewer to easily detect what is causing a compliance issue, and why.

Elements of figures are shown and described as discrete elements in block diagrams. These may be implemented as one or more of analog circuitry or digital circuitry. Alternatively, or additionally, they may be implemented with one or more microprocessors executing software instructions. The software instructions can include digital signal processing instructions. Operations may be performed by analog circuitry or by a microprocessor executing software that performs the equivalent of the analog operation. Signal lines may be implemented as discrete analog or digital signal lines, as a discrete digital signal line with appropriate signal processing that is able to process separate signals, and/or as elements of a wireless communication system.

When processes are represented or implied in the block diagram, the steps may be performed by one element or a plurality of elements. The steps may be performed together or at different times. The elements that perform the activities may be physically the same or proximate one another, or may be physically separate. One element may perform the actions of more than one block.

Examples of the systems and methods described herein comprise computer components and computer-implemented steps that will be apparent to those skilled in the art. For example, it should be understood by one of skill in the art that the computer-implemented steps may be stored as computer-executable instructions on a computer-readable medium such as, for example, floppy disks, hard disks, optical disks, Flash ROMS, nonvolatile ROM, and RAM. Furthermore, it should be understood by one of skill in the art that the computer-executable instructions may be executed on a variety of processors such as, for example, microprocessors, digital signal processors, gate arrays, etc. For ease of exposition, not every step or element of the systems and methods described above is described herein as part of a computer system, but those skilled in the art will recognize that each step or element may have a corresponding computer system or software component. Such computer system and/or software components are therefore enabled by describing their corresponding steps or elements (that is, their functionality), and are within the scope of the disclosure.

A number of implementations have been described. Nevertheless, it will be understood that additional modifications may be made without departing from the scope of the inventive concepts described herein, and, accordingly, other examples are within the scope of the following claims.

What is claimed is:

1. A computer-implemented method for real-time digital insurance policy verification of an insured by a requestor using a least one of an insurance agency data management system and an insurance company policy administration system, the method comprising one or more computer processors performing:

creating an integrated network by directly interconnecting at least the insurance agency data management system and the insurance company policy administration system such that these two systems are configured to directly and automatically communicate without user input;

continuously and automatically, without human intervention or input, providing the insured's policy information from the insurance company policy administration system to the network, to develop and maintain up to date policy information;

receiving over the integrated network a request for a certificate of insurance for the insured directly from a requesting party or from a third-party system that is configured to communicate with the integrated network, the request including insurance policy requirements for the insured;

automatically, without human intervention or input, comparing the policy requirements of the request to the insured's up to date policy information;

if there are any discrepancies between the policy requirements of the request and the insured's up to date policy information, automatically and without human intervention or input notifying over the integrated network an insurance agent, the insured, and the requestor of the discrepancies;

if there are no discrepancies between the policy requirements of the request and the insured's up to date policy information, automatically, without human intervention or input, generating a certificate of insurance (COI) based on the comparison; and then automatically, without human intervention or input, transmitting the up to date policy information and the COI to the requestor over the integrated network.

2. The method of claim 1, wherein the discrepancies comprise types of insurance being requested, required limits, and requested endorsements.

3. The method of claim 1, further comprising allowing an insured to have any requests and outstanding issues sent directly to an agent who represents the insured.

4. The method of claim 3, further comprising allowing the insured to grant to the agent the right to directly act on behalf of the insured via the system.

5. The method of claim 1, further comprising allowing an insurance carrier to directly and automatically interface with the integrated network.

6. The method of claim 5, wherein the insurance carrier provides policy details and endorsement documents.

7. The method of claim 1, further comprising allowing an insurance carrier rating organization to directly and automatically interface with the integrated network.

8. The method of claim 7, wherein the insurance carrier rating organization provides insurance carrier identification and rating information.

* * * * *